United States Patent [19]
Ohnishi

[11] Patent Number: 4,612,541
[45] Date of Patent: Sep. 16, 1986

[54] DATA TRANSMISSION SYSTEM HAVING HIGH-SPEED TRANSMISSION PROCEDURES

[75] Inventor: Yoshiichi Ohnishi, Tokyo, Japan

[73] Assignee: Tokyo Shibaura Denki Kabushiki Kaisha, Kawasaki, Japan

[21] Appl. No.: 545,775

[22] Filed: Oct. 26, 1983

[30] Foreign Application Priority Data

Oct. 27, 1982 [JP] Japan .................. 57-188613

[51] Int. Cl.$^4$ .......................... H04Q 9/00; H04J 3/08
[52] U.S. Cl. .................................. 340/825.05; 370/86
[58] Field of Search ................. 340/825.05, 825.03; 370/94, 60, 86

[56] References Cited

U.S. PATENT DOCUMENTS

| 4,042,783 | 8/1977 | Gindi | 370/86 |
| 4,489,379 | 12/1984 | Lanier | 370/86 |
| 4,499,576 | 2/1985 | Fraser | 370/94 |
| 4,510,492 | 4/1985 | Mori et al. | 340/825.05 |

Primary Examiner—Donald J. Yusko
Attorney, Agent, or Firm—Cushman, Darby & Cushman

[57] ABSTRACT

In a data transmission system, a given data transmission apparatus or station (STN) transfers a transmission start command (indicating the start of transmission) to an associated terminal thereof when the given station receives a send request signal from a distant terminal (T). Conversely, the given station receives data from the distant station through a high-speed transmission line and at the same time transfers a reception request command (indicating a reception request) to its associated terminal. The given terminal (as opposed to the distant terminal) transfers transmission data for a desired distant terminal to the given station when the command is a transmission start command, and the given terminal is then held in the status waiting state. However, when the command is a reception request command, the given station transfers the reception start signal to the given station and is held in the data waiting state. The given station can receive data transferred from the terminal thereof and at the same time transmit this data to the distant station through the high-speed transmission line. When the data transmitted through the high-speed transmission line is normally received by the distant station, the given station transfers the transmission end status signal to its associated terminal. When data which is received through the high-speed transmission line is completely transferred, the given station transmits the reception end status to its terminal.

4 Claims, 18 Drawing Figures

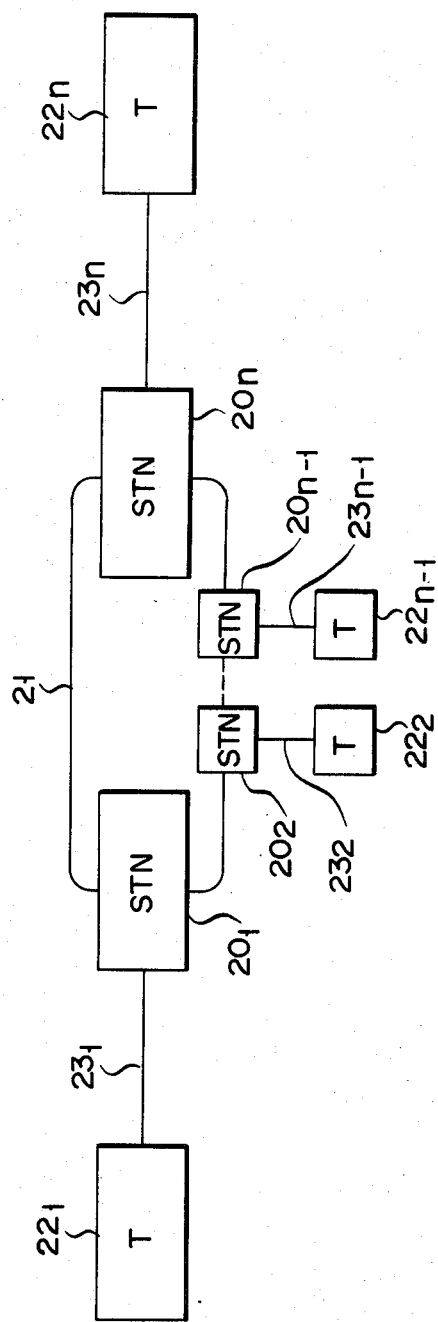
F I G. 3

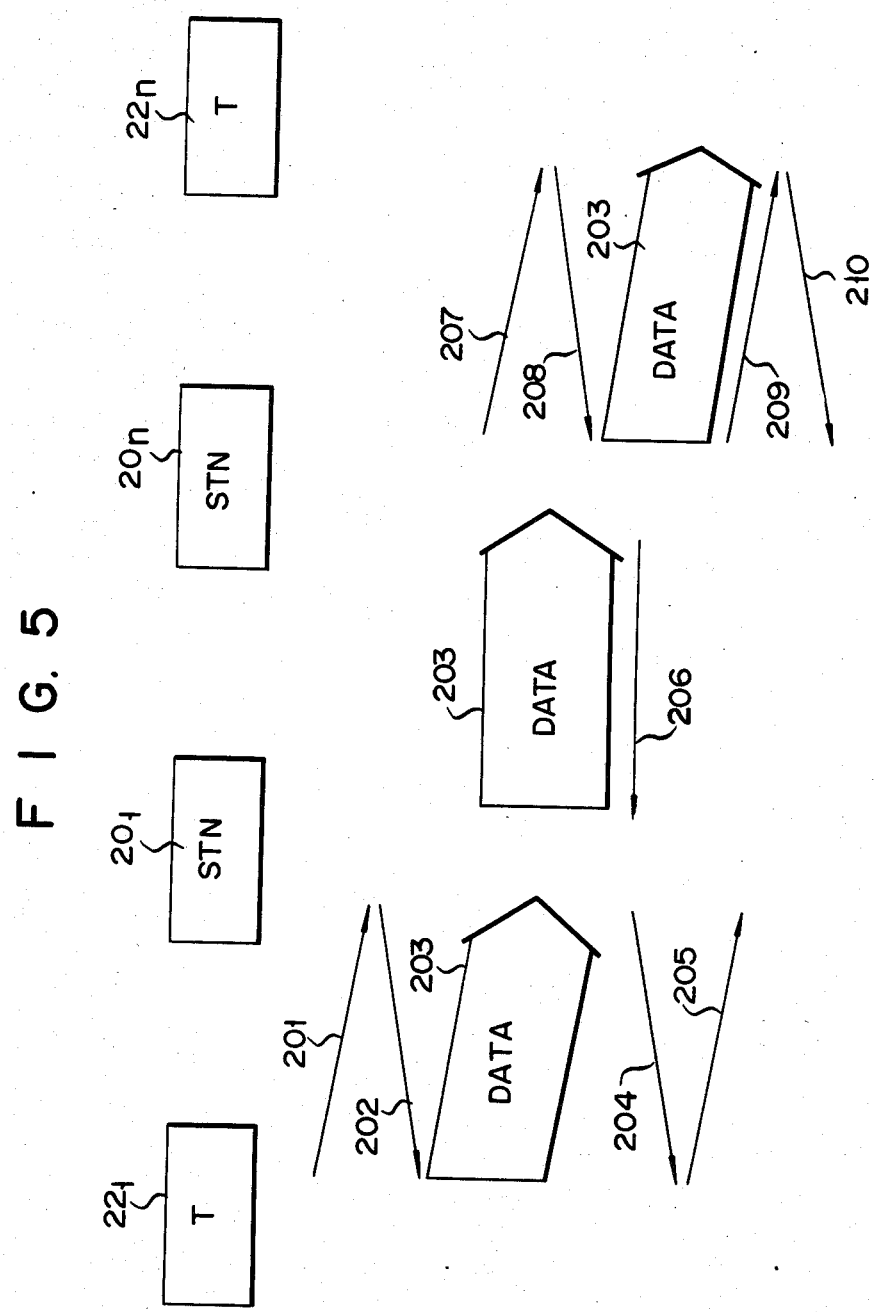

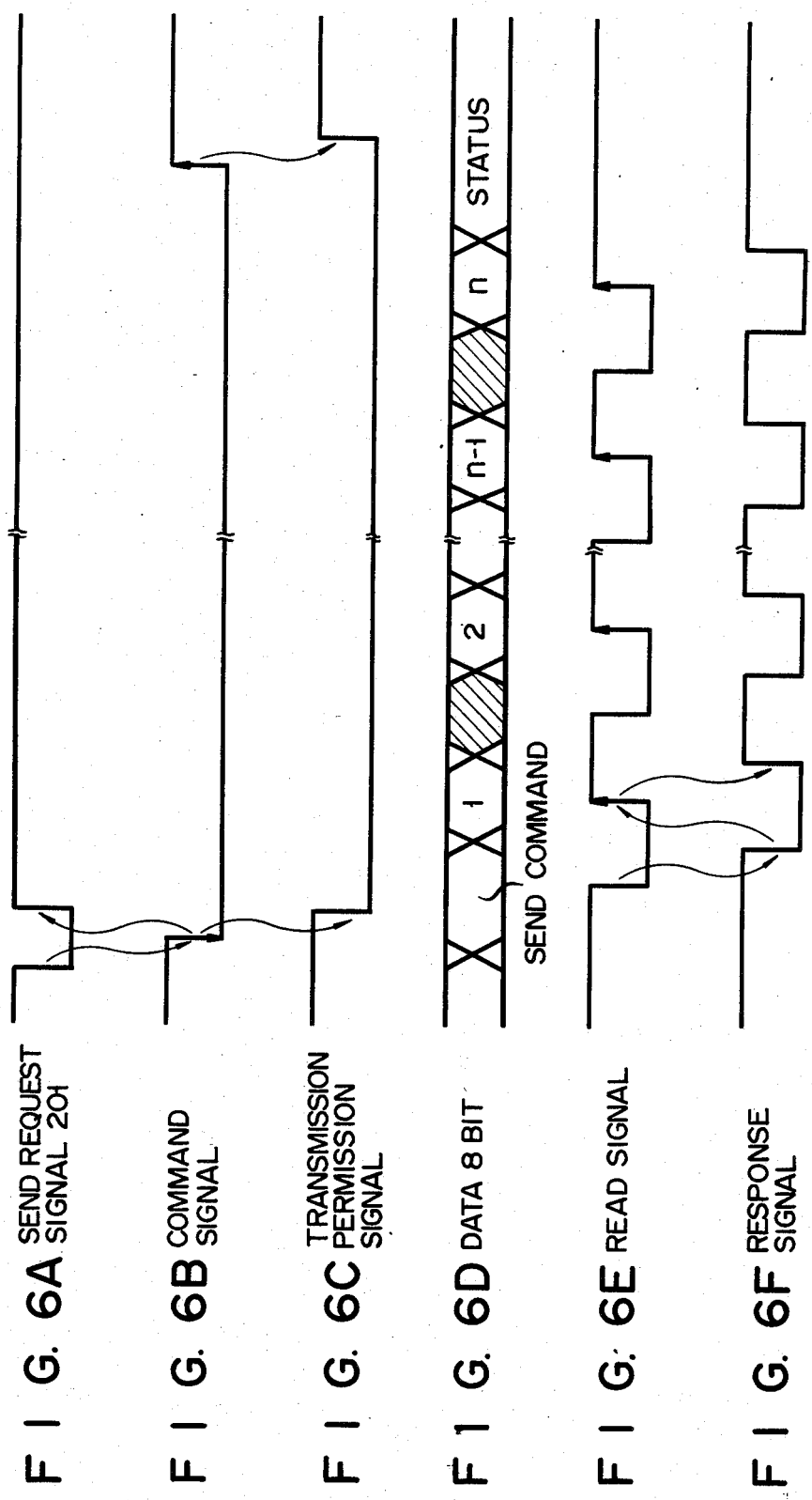
FIG. 6A SEND REQUEST SIGNAL 201
FIG. 6B COMMAND SIGNAL
FIG. 6C TRANSMISSION PERMISSION SIGNAL
FIG. 6D DATA 8 BIT
FIG. 6E READ SIGNAL
FIG. 6F RESPONSE SIGNAL

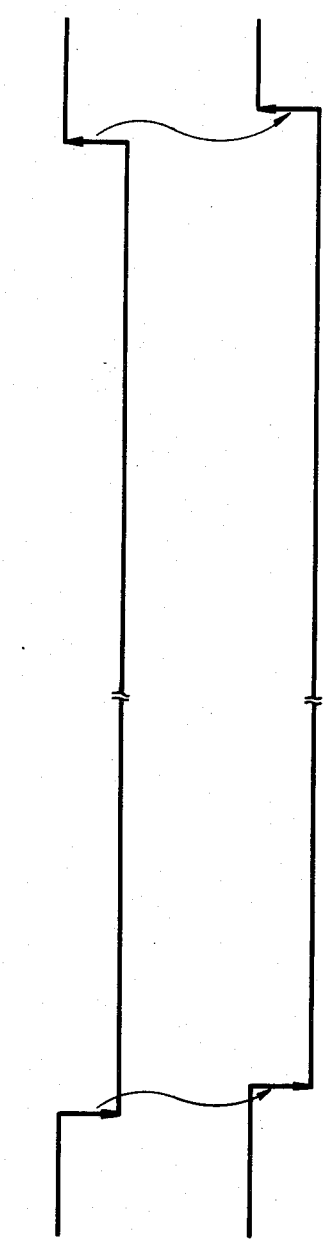
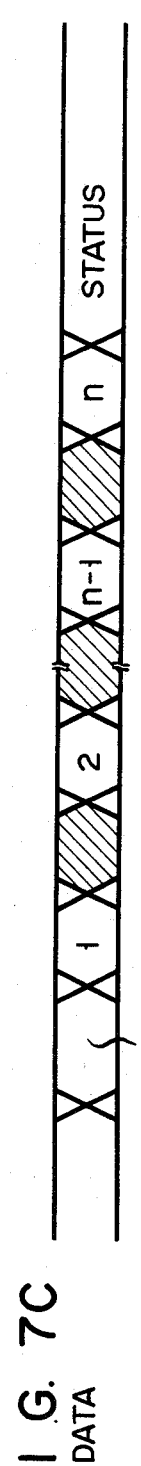
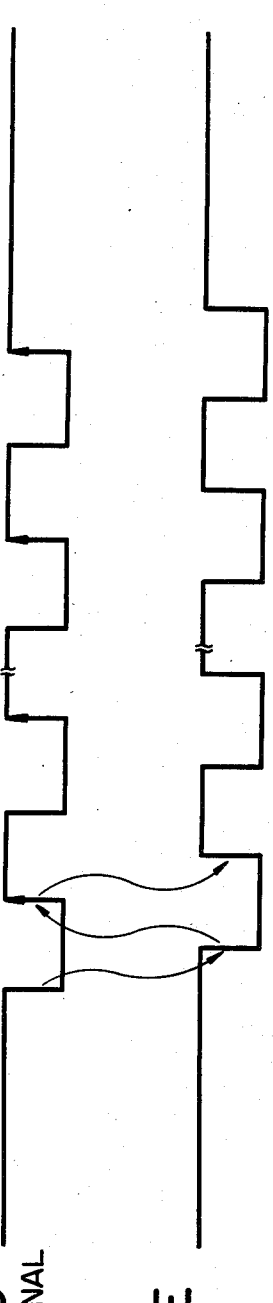
FIG. 7A COMMAND SIGNAL
FIG. 7B TRANSMISSION PERMISSION SIGNAL
FIG. 7C DATA
FIG. 7D WRITE SIGNAL
FIG. 7E RESPONSE SIGNAL

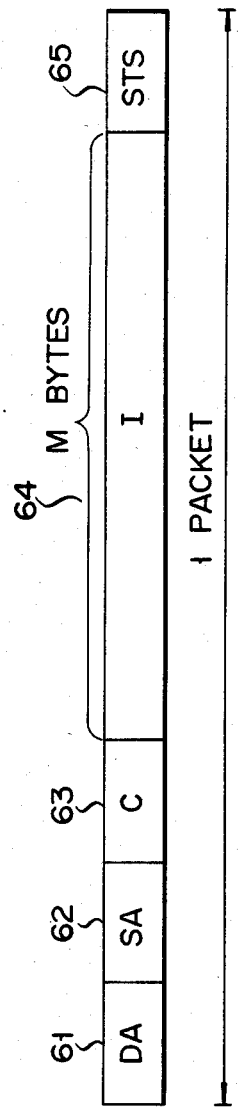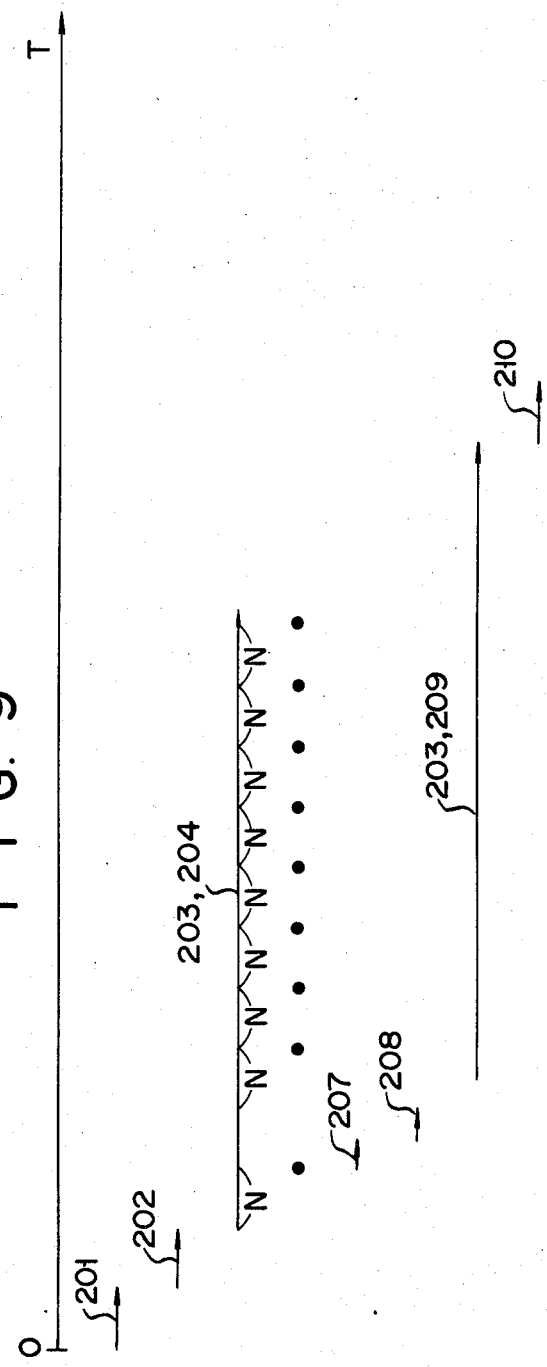

DATA TRANSMISSION SYSTEM HAVING HIGH-SPEED TRANSMISSION PROCEDURES

BACKGROUND OF THE INVENTION

The present invention relates to a data transmission system having a high-speed transmission line for coupling a plurality of data transmission apparatuses and terminals connected to these data transmission apparatuses, thereby performing communication between the terminals in accordance with high-speed transmission procedures.

A high-speed data way system is known as a data transmission system of this type wherein a plurality of data transmission apparatuses (nodes or data transmission stations; to be referred to as stations hereinafter) are looped together by a high-speed transmission line such as an optical fiber cable and a coaxial cable. In this system, computers and terminals which are coupled to the plurality of stations communicate with each other through a looped transmission line. More specifically, for example, in order to transmit or send data from a terminal (T) $12_1$ connected to a station (STN) $10_1$ to a terminal $12_n$ connected to a station $10_n$, data must be first transmitted from the terminal $12_1$ to the station $10_1$ and finally from the station $10_n$ to the terminal $12_n$, as shown in FIG. 1. Data transmissions between the terminal $12_1$ and the station $10_1$, between the station $10_1$ and the station $10_n$ and between the station $10_n$ and the terminal $12_n$ are performed in the same manner (according to data transmission procedures), as shown in FIG. 1. Reference numeral 101 denotes a send request signal; 102, a transmission permission signal indicating permission to transmit in response to the send request signal 101; 103, a signal comprising message data; 104, a transmission end signal indicating the end of transmission; and 105, a reception end signal indicating permission to terminate reception in response to the transmission end signal 104. In the above case where data is transmitted from the terminal $12_1$ to the terminal $12_n$, status data indicating that the data transmitted from the station $10_1$ has reached the station $10_n$ must be sent from the station $10_1$ to tne terminal $12_1$. This status data must be transmitted in the same manner as a sequence of data transmission procedures involving exchange of signals (or data) 101 through 105 between the station $10_1$ and the terminal $12_1$, as indicated in the lower part of FIG. 1. FIG. 2 is a timing chart of the sequence of data transmission procedures as a function of time (plotted along the abscissa). Therefore, the following procedures are conventionally performed on a time serial basis:

(i) The send request signal 101 is transmitted from the terminal $12_1$ to the station $10_1$.

(ii) The transmission permission signal 102 is transmitted from the station $10_1$ to the terminal $12_1$.

(iii) The message data 103 and the transmission end signal 104 are transmitted from the terminal $12_1$ to the station $10_1$.

(iv) The reception end signal 105 indicating a permission to terminate reception in response to the transmission end signal 104 is transmitted from the station $10_1$ to the terminal $12_1$.

(v) The message data 103 is transmitted from the station $10_1$ to the station $10_n$.

(vi) The send request signal 101 is transmitted from the station $10_n$ to the terminal $12_n$.

(vii) The transmission permission signal 102 indicating a permission to transmit in response to the send request signal 101 is transmitted from the terminal $12_n$ to the station $10_n$.

(viii) The message data 103 and the transmission end signal 104 are transmitted from the station $10_n$ to the terminal $12_n$.

(ix) The reception end signal 105 indicating a permission to terminate reception in response to the transmission end signal 104 is transmitted from the terminal $12_n$ to the station $10_n$.

In the conventional data transmission system described above, in order to transmit data from a terminal connected to one (given) station to a terminal connected to another station, many data transmission procedures between the given station and the terminal of the station which is distant with respect to the given station must be performed. As a result, high-speed transmission cannot be performed. In such a system, a sequence of data transmission procedures are first performed between the given terminal and the given station. Thereafter, the data is transmitted from the given station to the distant station. The data is then further transmitted to the distant terminal only after another series of data transmission procedures are performed between the distant station and the distant terminal. As a result, high-speed transmission is difficult to perform.

SUMMARY OF THE INVENTION

It is an object of the present invention to provide a data transmission system wherein data transmission procedures can be reduced to perform high-speed data transmission between stations (data transmission apparatuses), thereby achieving high-speed data transmission between terminals (terminal devices).

In order to achieve the above object of the present invention, there is provided a data transmission system having a high-speed transmission line connected to a plurality of data transmission apparatuses and terminals connected to these data transmission apparatuses, thereby performing communication between the terminals in accordance with high-speed transmission procedures, wherein each of said terminals comprises means for transferring a send request signal to an associated data transmission apparatus among said plurality of data transmission apparatuses at the time of data transmission, means for decoding a command transmitted from said associated data transmission apparatus and for transferring to said associated data transmission apparatus transmission data for a desired, distant terminal among said terminals when the command is a transmission start command and transferring a reception start signal thereto when the command is a reception request command, and means for transmitting a transmission end signal to said associated data transmission apparatus when status data received from said associated data transmission apparatus after the reception start signal is transferred is transmission end status data and for transmitting a reception end signal to said associated data transmission apparatus when the status data received therefrom is reception end status data; and each of said plurality of data transmission apparatuses comprises means for receiving transmission data from an associated terminal among said terminals and for transmitting the transmission data to a data transmission apparatus associated with a distant terminal of said terminals through said high-speed transmission line, means for transferring a reception request command to said distant terminal while receiving transmission data therefor through said high-speed transmission line, means for transferring a send request command to said associated terminal in response to a send request signal from said associated terminal, means for transferring the data received through said high-speed transmission line to said distant terminal in response to a reception start signal from said distant terminal, and means for transferring to said associated terminal a transmission end status signal when the transmission data has been properly received by said transmission apparatus associated with said distant terminal and transferring a reception end status signal thereto when reception data received through said high-speed transmission line is properly transferred to said distant terminal.

In order to decrease the data transmission procedures in data transmission between the terminals, the stations and the terminals are arranged such that each station has priority over the associated terminal, unlike the conventional relationship between stations and terminals. In response to a send request signal from a distant terminal, a given station sends a transmission start command to the associated terminal. The given station then receives data transmitted from the distant station through the high-speed transmission line and transmits a reception request command to the associated given terminal in accordance with the received data. On the other hand, the given terminal decodes a command from the given station and performs operation in accordance with the command from the given station. When the command is a transmission start command, the given terminal transfers the transmission data for a desired distant terminal to the associated given station. The given terminal is then kept in the status waiting state. However, when the command is a reception request command, the given terminal transfers a reception request signal to the associated given station and is kept in the data waiting state. The given station receives data transferred from the associated given terminal and transmits through the high-speed transmission line data indicating a data reception request to the distant station whose terminal is designated. When data transmission through the high-speed transmission line is properly completed at the distant station, the given station transfers a transmission end status signal to the associated given terminal. Furthermore, when data received by the given station through the high-speed transmission line is completely transferred to the associated given terminal, the given station transfers a reception end status signal to the associated given terminal.

When the given terminal receives the transmission end status signal or the reception end status signal from the associated given station, the given terminal completes the data transmission procedures by transferring the corresponding transmission end signal or the corresponding reception end signal to the given station. Furthermore, while the given station receives data from either another distant station or the associated given terminal, the given station can transmit received data to either this distant station or the associated given terminal. As a result, high-speed transmission between the stations can be effectively performed.

BRIEF DESCRIPTION OF THE DRAWINGS

Other objects and features of the present invention will be apparent from the following descriptions of the accompanying drawings summarized below:

FIG. 3 is a block diagram showing the system configuration of a data transmission system of the present invention;

FIG. 5 is a representation for explaining the transmission procedures of the system shown in FIG. 3;

FIGS. 6A through 6F are timing charts of signals used for transmitting data from a terminal (T) to a station, in which FIG. 6A shows a send request signal, FIG. 6B shows a command signal, FIG. 6C shows a transmission permission signal, FIG. 6D shows a transfer data, FIG. 6E shows a read signal and FIG. 6F shows a response signal;

FIGS. 7A through 7E are timing charts of signals used for transmitting data from a station to a terminal, in which FIG. 7A shows a command signal, FIG. 7B shows a transmission permission signal, FIG. 7C shows data, FIG. 7D shows a write signal, and FIG. 7E shows a response signal;

FIG. 8 shows a packet format as a transmission unit; and

FIG. 9 is a timing chart of transmission procedures (FIG. 5) as a function of time.

DETAILED DESCRIPTION OF THE PREFERRED EMBODIMENT

Figure 1:
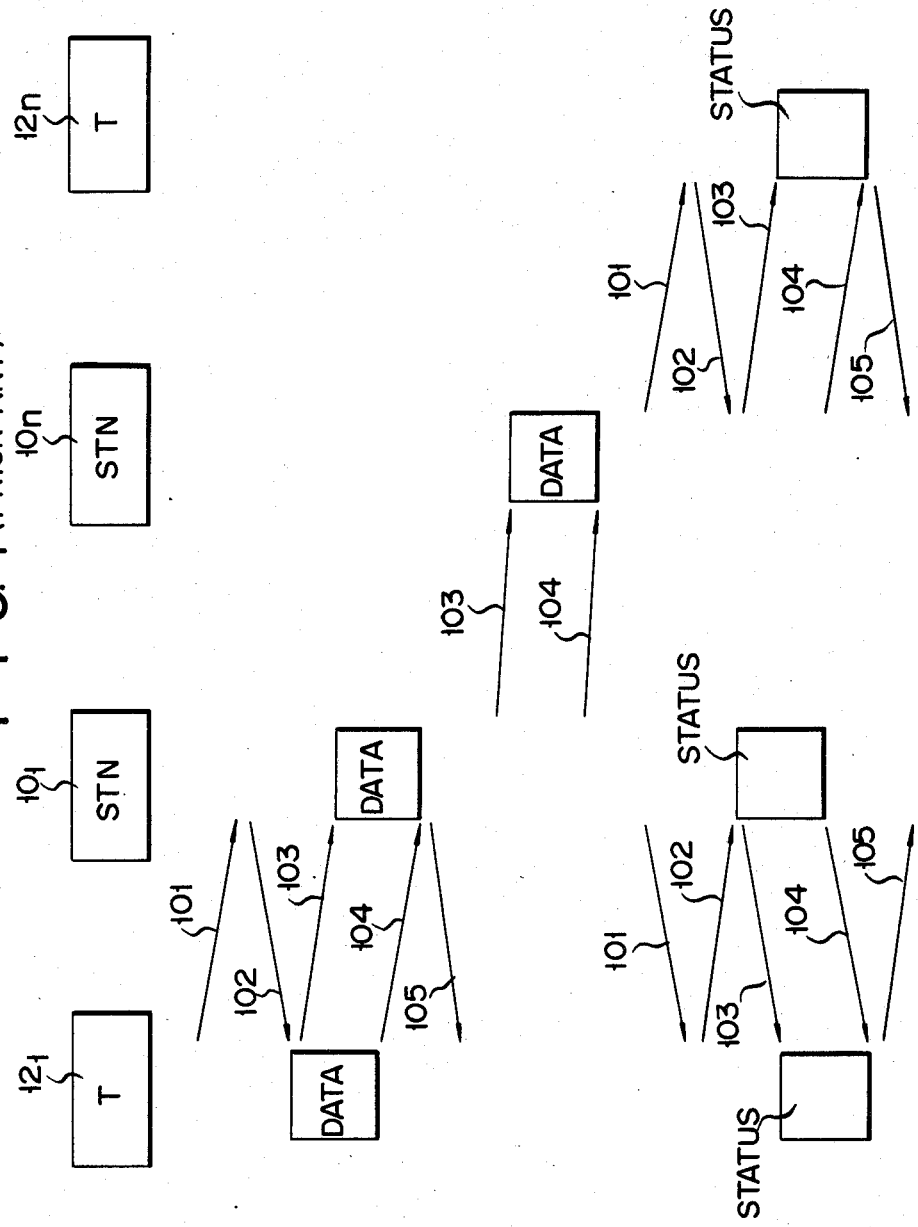
FIG. 1 is a representation for explaining the transmission procedures of a conventional data transmission system.

FIG. 3 shows a high-speed data way system as one of the data transmission systems according to an embodiment of the present invention. Data transmission stations (to be also referred to as data transmission apparatuses or STN) $20_1$ through $20_n$ are connected to a high-speed transmission line 21 such as an optical fiber cable or a coaxial cable so as to form a loop. Terminals (to be referred to as Ts hereinafter) $22_i$ (i=1, 2, ..., n) such as computers and terminal devices are connected to stations $20_i$ (i=1, 2, ..., n) through buses $23_i$ (=1, 2, ..., n), respectively. However, a plurality of items of terminal equipment can be connected to a STN $20_i$.

Each STN $20_i$ (i=1, 2, ..., n) has the following functions. (It should be noted that data and signal flows are illustrated in FIG. 5.)

1. The STN $20_i$ receives data 203 from an associated sending terminal T$22_i$ and transmits the data 203 to a distant STN $20_j$ through the high-speed transmission line 21.

2. While the STN $20_i$ is receiving data transmitted through the high-speed transmission line 21, the STN $20_i$ transmits a reception request command 207 together with a command signal to the sending T $22_i$.

3. The STN $20_i$ transfers to an associated sending T $22_i$ a command signal 202 indicating permission for data transmission in response to a send request signal 201 from the associated sending T $22_i$.

4. The STN $20_i$ transfers to the associated receiving T $22_i$ in response to a reception start signal 208 therefrom the data 203 received through the high-speed transmission line 21.

5. When data transmitted through the high-speed transmission line 21 is normally received, the STN $20_i$ transmits a transfer end status signal 206 to the sending STN $20_j$.

6. When the transfer end status signal 206 is received through the high-speed transmission line 21, the STN $20_i$ transfers a transmission end status signal 204 to the sending T $22_i$.

7. After the reception data from the high-speed transmission line 21 is transferred to the receiving T $22_i$, the STN $20_i$ transfers a reception end status signal 209 to the corresponding sending T $22_i$.

8 When the receiving STN $20_i$ cannot receive a reception start signal 208 from a sending T $22_i$ after the STN $20_i$ has transferred a reception request command 207 to this sending T $22_i$ and after a predetermined time interval has elapsed, the STN $20_i$ transmits a retransmission request status signal (not shown) to the sending STN $20_i$.

9. When the sending STN $20_i$ receives the retransmission request status signal, this sending STN $20_i$ transmits data indicating a retransmission request to the sending T $22_i$.

These functions can be accomplished in accordance with firmware control.

Figure 4:
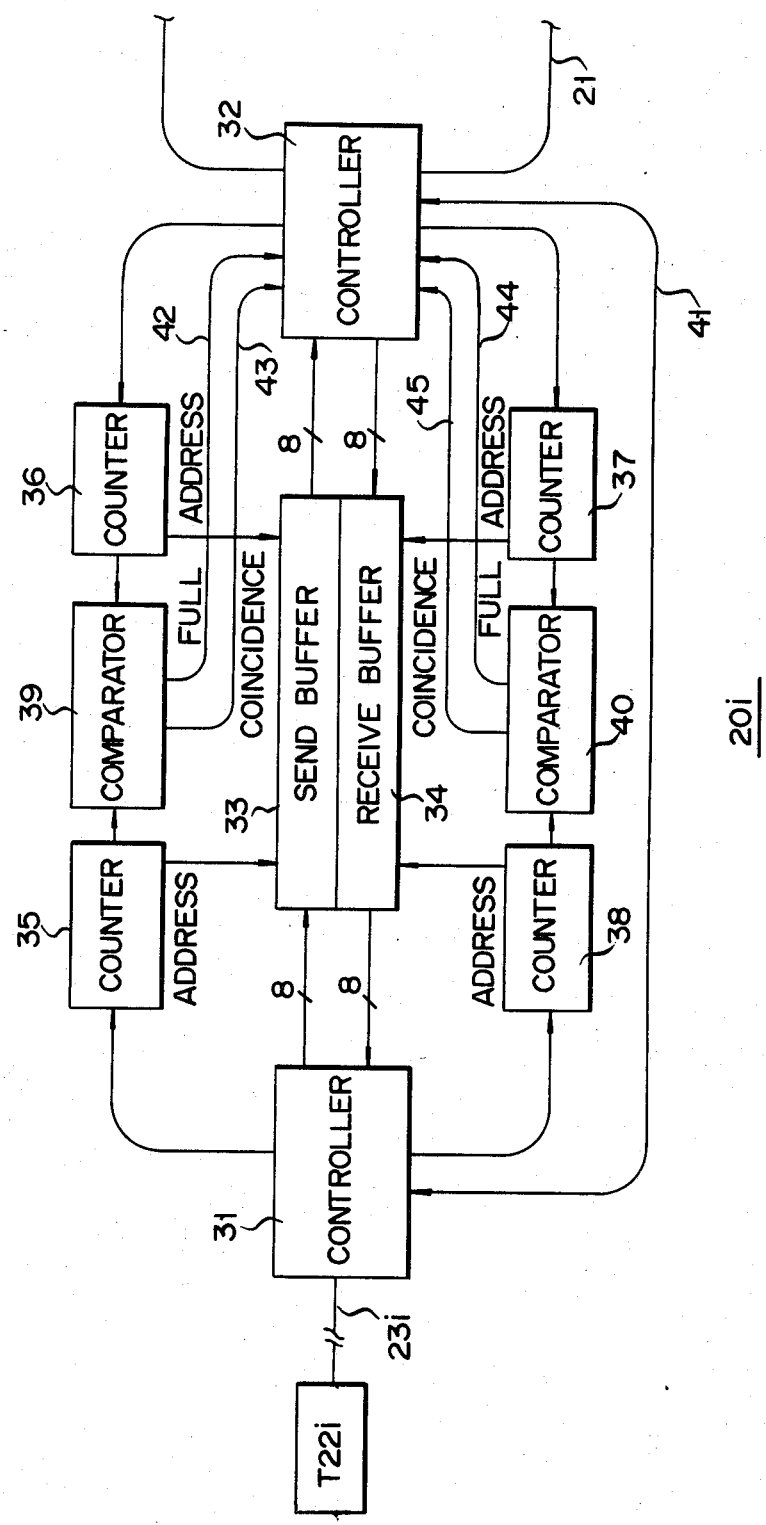
FIG. 4 is a block diagram showing the main part of a data transmission station (STN) shown in FIG. 3.

In this embodiment, the sending station can receive data transferred from the associated sending T $22_i$ and transmit this data to a distant STN in parallel processing. Furthermore, the receiving station can receive data transmitted from the sending station and transfer this received data to the receiving terminal in parallel processing. Each station or STN $20_i$ has the configuration shown in FIG. 4. The STN $20_i$ comprises controllers 31 and 32, a send buffer 33, a receive buffer 34, counters 35, 36, 37 and 38, and comparators 39 and 40. The controller 31 serves as an interface circuit between the bus $23i$ and the internal circuits. The controller 32 serves as an interface between the high-speed transmission line 21 and the internal circuits. The controllers 31 and 32 can comprise CPUs 8086 manufactured by Intel Corp. (U.S.A.) The send buffer 33 stores data received through the controller 31 via the bus $23i$. The receive buffer 34 stores data received through the controller 32 via the high-speed transmission line 21. These buffers 33 and 34 have a FIFO function. The counters 35 and 36 serve as a write pointer for the buffer 33 and a read pointer for the buffer 33, respectively. The counters 37 and 38 serve as a write pointer for the buffer 34 and a read pointer for the buffer 34, respectively. The comparator 39 compares the output signals from the counters 35 and 36 and generates a coincidence signal when a coincidence between the input signals is detected. The comparator 39 also serves to detect a full state of the buffer 33 in accordance with the output signal from the counter 35. The comparator 40 functions in the same manner as the comparator 39. However, in this case, the comparator 40 receives output signals from the counters 37 and 38. The controller 31 receives a data array transferred from the T $22_i$ through the bus $23i$ and supplies this data array to the buffer 33. Furthermore, the controller 31 detects the end data of the data array and supplies an end data detected signal to the controller 32, and sends to the T $22_i$ through the bus $23i$ data read out from the buffer 34. The controller 32 edits the data read out from the buffer 33, generates transmission data in a predetermined format, and transmits this transmission data onto the high-speed transmission line 21. Furthermore, the controller 32 receives data through the high-speed transmission line 21. When this data is to be transmitted to a given STN $20_i$ (with respect to a distant station), a transfer data array for the T $22_i$ is extracted from the above-mentioned data, and the extracted data array is supplied to the buffer 34. In addition to these functions, the controller 32 detects the end data of the extracted data array and supplies an end data detected signal to the controller 31.

Referring again to FIG. 3, the T $22_i$ (i = 1, 2, . . . , n) has the following functions:

1. The T $22_i$ generates a send request signal 201 to an associated STN $20_i$ at the time of data transmission.

2. When the T $22_i$ decodes a transmission start command 202 from the associated given STN $20_i$ (as opposed to the distant STN $20_j$), the T $22_i$ is kept in the status waiting state.

3. When the T $22_i$ decodes a reception request command 207, the T $22_i$ transfers a reception start signal 208 to the given STN $20_i$.

4. After the reception start signal 208 is transferred to the given STN $20_i$, the T $22_i$ receives the data 203 from the given STN $20_i$.

5. When the status signal transferred from the given STN $20_i$ is the transmission end status signal 204, the T $22_i$ transfers the transmission end signal 205 to the given STN $20_i$. However, when the status signal is the reception end status signal 209, the T $22_i$ transfers the reception end signal 210 to the given STN $20_i$.

These functions can be realized by a known technique such as firmware control.

The operation of the data transmission system according to this embodiment will now be described with reference to the transmission procedure diagram of FIG. 5 and timing charts of signals exchanged between the terminals and the stations shown in FIGS. 6A through 6F and FIGS. 7A through 7E when data is transmitted from the T $22_1$ to the T $22_n$.

1. The T $22_1$ transmits the send request signal 201 (FIG. 6A) onto a data line of the bus $23_1$, so that the send request signal 201 is transmitted to the STN 201.

2. When the STN $20_1$ receives the send request signal 201, it transmits the transmission start command 202 onto a data line of the bus $23_1$ so as to cause the command signal shown in FIG. 6B to fall.

3. The T $22_1$ latches the transmission start command 202 at the trailing edge of the command signal. The T $22_1$ is interrupted in response to the command signal, so that the T $22_1$ decodes the latched command. In this manner, when the transmission start command 202 is latched by the T $22_1$, the T $22_1$ generates a transmission permission signal shown in FIG. 6C.

4. When the STN $20_1$ receives the transmission permission signal from the T $22_1$, the STN $20_1$ generates a read signal (FIG. 6E) to the T $22_1$.

5. When the T $22_1$ receives the read signal, it generates a response signal (FIG. 6F) together with data (8-bit data in this embodiment) shown in FIG. 6D onto the bus $23_1$ and transmits them to the STN $20_1$. The start portion of the data 203 comprises a receiving terminal (T $22_n$ in this embodiment) address, the sending terminal (T $22_1$ in this embodiment) address, and transmission data quantity (bytes).

6. When the STN $20_1$ receives the response signal, the STN $20_1$ receives the data 203 on the bus $23_1$, so that the read signal is disabled.

7. In response to the operations indicated by items 1 to 6, the T $22_1$ disables the data 203 and the response signal. Thereafter, the STN $20_1$ generates the read signal to the T $22_1$, and items 5, 6 and 7 are repeatedly performed.

8. The buffer 33 of the STN $20_1$ receives the data 203 appearing on the bus $23_1$ in units of a predetermined number of bits and sends the received data through the high-speed transmission line 21 to the STN $20_n$ coupled to the receiving T $22_n$. Thereafter the T $22_1$ is kept in the status waiting state.

9. When the STN $20_1$ has sent all data components of the data 203 and has received the transfer end status signal 206 from the receiving STN $20_n$, the STN $20_1$ transmits the transmission end status signal 204 to the T $22_1$. When the T $22_1$ decodes the transmission end status signal 204, the command signal rises.

10. The T $22_1$ receives the status signal at the leading edge of the command signal and detects whether or not data transmission is completely performed. If the T $22_1$ detects the completion of data transmission, it generates the transmission end signal 205 to the STN $20_1$.

The detailed operation of the STN $20_1$ will be described as follows. The controller 31 of the STN $20_1$ receives the data 203 on the bus $23_1$ in units of a predetermined number of bits (e.g., in units of 8 bits) and supplies it to the buffer 33. Furthermore, the controller 31 increments the counter 35 in synchronism with the output timing of signals to the buffer 33 (it should be noted that the counter 35 is initialized at the beginning). The controller 31 writes the data in units of a predetermined number of bits at an address location of the buffer 33 which is indicated by the count of the counter 35. The output count of the counter 35 changes in a sequence of "0", "1", "2", . . . in accordance with the control by the controller 31, thereby writing the data 203 from address 0 of the buffer 33. When the count of the counter 35 has reached a maximum address N of the buffer 33, the comparator 39 detects that the buffer 33 is full and generates a full signal 42 to the controller 32.

The controller 32 is then set in the read mode in response to the full signal 42 from the comparator 39. In the read mode, the controller 32 initializes the counter 36 and increments the counter 36 at a high speed (in this embodiment, the counter 36 counts from "0" to "N" while the count of the counter 35 changes from "N" to "0"). Data are sequentially read out from address locations of the buffer 33 which are indicated by counts of the counter 36. In this case, the count of the counter 36 changes in a sequence of "0", "1", "2", . . . , so that the data components of the data 203 are read out from the address 0 of the buffer 33. When the count of the counter 36 reaches a maximum address N of the buffer 33, the comparator 39 detects a coincidence between the count of the counter 36 and that of the counter 35 and supplies a coincidence signal 42 to the controller 32. In this embodiment, the counts of the counters 35 and 36 (or 37 and 38) circulate in sequences of "0", "1", "2", . . . , "N" and "0", "1", "2", . . . , "N", respectively. The one-cycle counting period of the counter 36 (37) is shorter than that in which the count of the counter 35 (38) is incremented by one. Therefore, in this embodiment, the count of the counter 35 is incremented until it reaches N under the control of the controller 31, and data is written in the buffer 33. When the buffer 33 becomes full, all the data stored in the buffer 33 are read out in accordance with the count of the counter 36 under the control of the controller 32 before any subsequent data is written at the address 0 of the buffer 33. When all the data of the buffer 33 are read out or accessed (i.e., when the data is accessed from all N addresses), the counts of the counters 35 and 36 coincide with each other.

The controller 32 is released from the read mode in response to the coincidence signal 43 from the comparator 39. The controller 32 stops incrementing the counter 36. Meanwhile, the controller 31 continues to increment the counter 35, thereby sequentially writing data from the address 0 of the buffer 33. However, the end portion of the data array transmitted through the bus $23_1$ is processed in the following manner. The controller 31 has a transmission byte counter for counting the number of transmission bytes. This counter counts the number of transmission bytes every time data is received from the bus $23_1$ and is written in the buffer 33. When the count of the above-mentioned counter coincides with the transmission data quantity (number of transmission bytes) of the start portion of the data array, the controller 31 determines that the transmitted data is the end data and supplies an end data detected signal to the controller through a line 41. At the same time, the controller 31 stops incrementing the counter 35. The controller 32 is then set in the read mode in response to the end data detected signal. In this case, the release of the controller 32 from the read mode is not limited to the case wherein the counts of the counters 35 and 36 have reached N. For example, data which cannot be divided by N can also be generated, and the end data detected signal is supplied from the controller 31 to the controller 32 through the line 41.

In order to transmit the data array read out from the buffer 33 in each read mode to the STN $20_n$ in a format of one packet (serial data), the controller 32 generates the transmission data in a transmission format having a header. As shown in FIG. 8, one packet comprises a destination address (DA) 61, a source address (SA) 62, a control field (C) 63 and a status field (STS) 65. The STS 65 is added by the STN $22_n$ when data (I) 64 from the STN $20_1$ is normally received by the STN $22_n$. Therefore, when the STS 65 of the packet looped through the looped transmission line 21 is added under normal conditions, the STN $20_1$ generates the next data. However, when the STS 65 indicates an abnormal state, transmission is interrupted and its status signal is transmitted to the T $22_1$. The abnormal status signal occurring during the data transmission is immediately transmitted to the T $22_1$. This surveillance can be performed by the controller 32. The abnormal status signal is transmitted to the T $22_1$ through the line 41, the controller 31 and the bus $23_1$.

The controller 32 converts this transmission data to serial data and sends it onto a certain time slot of the high-speed transmission line 21. The above description relates the detailed operation of data reception by the STN $20_1$ from the bus $23_1$ and data transmission by the STN $20_1$ to the STN $20_n$, which latter is performed simultaneously with the data reception.

According to the present invention, the STN $20_1$ can transmit reception data onto the high-speed transmission line 21 without waiting for data indicating reception of a series of data arrays transmitted in accordance with a cycle of transmission procedures. Therefore, in data transmission from the T $22_1$ to the STN $20_n$, substantially no influence of the low data transmission rate between the T $22_1$ and the STN $20_1$ and between the STN $20_n$ and T $22_n$ is received. As a result, high-speed data transmission between the STNs $20_1$ and $20_n$ can be efficiently performed. Furthermore, in association with the above effect, a buffer having a capacity for storing a maximum possible data array transmitted in accordance with one cycle of transmission procedures need not be arranged as the buffer 33. According to this embodiment, as is apparent from the above description, the buffer 33 has only sufficient capacity for one packet of data.

The STN $20_n$ receives the data 203 on the high-speed transmission line 21. When the data 203 is the transmission data destined to itself, the STN $20_n$ receives the data 203 and updates the header of the corresponding slot of the high-speed transmission line 21. When the STN $20_1$ receives the updated header data through the high-speed transmission line 21, the STN $20_1$ detects that the STN $20_n$ has received the data.

The data transmission from the STN $20_n$ to the T $22_n$ will be described with reference to FIGS. 7A through 7E. The STN $20_n$ transmits the reception request command 207 onto a data line of the bus $23_n$ so as to cause the command signal (FIG. 7A) to fall. The T $22_n$ receives the command 207 in response to the falling of the command signal and decodes this command so as to cause the reception start signal 208 (FIG. 7B) to fall.

Meanwhile, the STN $20_n$ sends out the reception request command 207 and detects whether or not the reception start signal 208 is received in response from the T $22_n$ within a predetermined period of time. In response to receiving the reception start signal 208, the STN $20_n$ sets the reception data 203 (e.g., in units of bytes) on a data line of the bus $23_n$ and supplies the write signal (FIG. 7D) to the T $22_n$. The T $22_n$ receives the write signal appearing on the data bus and transmits the response signal (FIG. 7E) to the STN $20_n$. This is repeated for a number of times corresponding to the bytes of the transmission data. When the STN $20_n$ has transmitted all the data components of the data 203, the STN $20_n$ sets the reception end status signal on the data bus $23_n$, so that the command signal rises. Upon the rising of the command signal, the T $22_n$ receives the status signal on the data bus and detects whether or not reception is completely performed. If reception is completed, the T $22_n$ causes the reception start signal to fall. Data reception at the STN $20_n$ from the high-speed transmission line 21 and data transmission from the STN $20_n$ to the T $22_n$ will be described as follows.

The controller 32 in the STN $20_n$ converts to parallel data the data received from the high-speed transmission line 21 and supplies the data to the buffer 34 in units of a predetermined number of bits (e.g., 8 bits). The controller 32 increments the counter 37 in synchronism with the output timing of signals supplied to the buffer 34 (counter 37 is initialized at the beginning). The data having the predetermined number of bits is written at an address location of the buffer 34 which is indicated by the count of the counter 37. The count of the counter 37 changes in the sequence of "0", "1", "2", ..., "N" under the control of the controller 32, thereby sequentially writing the received data from the address 0 of the buffer 34. When the count of the counter 37 has reached a maximum address N of the buffer 34, the comparator 40 detects that the buffer 34 is full and supplies a full signal 44 to the controller 32.

When the controller 32 receives the full signal 44 from the comparator 40, the controller 32 stops incrementing the counter 37, so that data will not be written in the buffer 34 any longer. When the reception start signal 208 is transmitted from the T $22_n$ within the predetermined period of time, the controller 32 causes the controller 31 to be set in the read mode through the line 41 since the controller 32 receives the full signal 44 from the comparator 40. In the read mode, the controller 31 initializes and then increments the counter 38. Data are sequentially read out from the address locations of the buffer 34 which are indicated by the count of the counter 38. In this case, the count of the counter 38 changes in the sequence of "0", "1", "2", ..., "N", thereby sequentially reading out data from the address 0 of the buffer 34. The controller 31 transmits to the T $22_n$ through the bus $23_n$ the data read out from the buffer 34. When the count of the counter 38 has reached a maximum address N of the buffer 34, the comparator 40 detects a coincidence between the counts of the counters 37 and 38 and supplies a coincidence signal 45 to the controller 32. The controller 32 supplies a read mode release signal to the controller 31 in response to the coincidence signal 45 from the comparator 40. The controller 31 stops incrementing the counter 38 and stops reading out data from the buffer 34. Thereafter, the write/read access operation is repeated in the controller 32 every time a packet is received from the high-speed transmission line 21.

When the STN $20_n$ has received a set of packets from the STN $20_1$, the STN $20_n$ transmits the transfer end status signal 206 to the STN $20_1$. The STN $20_1$ transmits the transmission end status signal 204 to the T $22_1$ in response to the transfer end status signal 206 from the STN $20_n$. After the T $22_1$ has transmitted the data 203 to the STN $20_1$, the T $22_1$ is kept in the status waiting state. In this state, when the transmission end status signal 204 is transferred from the STN $20_1$, the T $22_1$ transmits the transmission end signal 205 to the STN $20_1$ in response to the status signal 204 and thereby completes a sequence of transmission procedures. According to this embodiment, the data 203 from the T $22_1$ can be transmitted to the STN $20_n$ in accordance with one-cycle transmission procedures between the T $22_1$ and the STN $20_1$. As a result, high-speed transmission can be performed.

When the STN $20_n$ completes transmission of the data components of the data 203 to the T $22_n$, the STN $20_n$ transmits the reception end status signal 209 to the T $22_n$. The T $22_n$ transmits the reception end signal 210 (FIG. 7E) to the STN $20_n$ in response to the reception end status signal 209.

Figure 2:
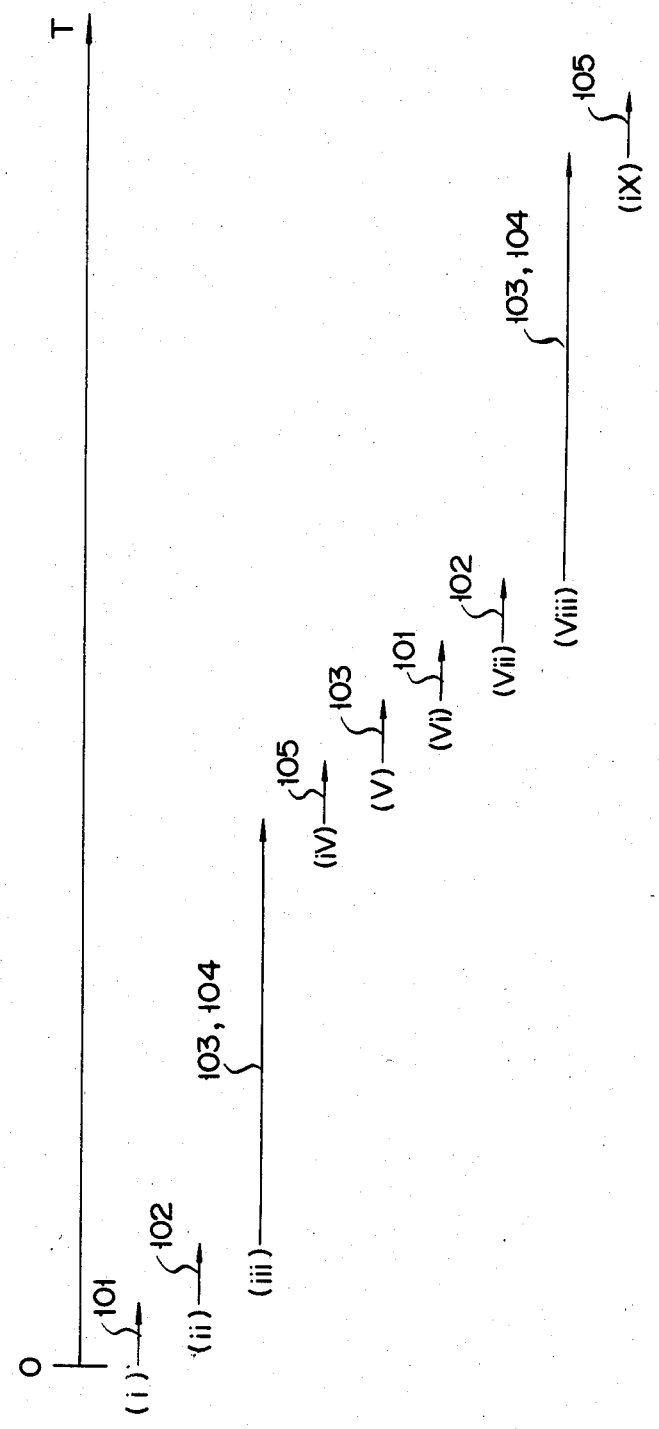
FIG. 2 is a timing chart of signals as a function of time so as to explain the data transmission procedures shown in FIG. 1.

FIG. 9 shows the transmission procedures as a function of time. Referring to FIG. 9, reference symbol N denotes N bytes. Each dot designates a packet. The T $22_1$ awaits the reception permission signal from the distant station. When the T $22_1$ receives the reception permission signal, the T $22_1$ transmits data in synchronism with the distant T $22_n$ in units of N bytes. If no data is present even when the count does not reach N, the remaining data can be transferred. As will be apparent from comparison with the case in FIG. 2, the transmission procedures can be simplified and high-speed data transmission can be performed.

In the embodiment described above, the data transmission system comprises a data way system (loop data transmission system). However, the present invention can also be applied to a star network system or the like.

What is claimed is:
1. A data transmission system comprising:
 a plurality of data transmission apparatuses;
 a high-speed transmission line connected to said plurality of data transmission apparatuses; and
 at least one terminal connected to each of said data transmission apparatuses, respectively thereby performing communication between said terminals in accordance with high-speed transmission procedures, each said terminal comprising:

means for transferring a send request signal to an associated data transmission apparatus among said plurality of data transmission apparatuses at the time of data transmission, means for decoding a command transmitted from said associated data transmission apparatus and for transferring to said associated data transmission apparatus transmission data for a desired, distant terminal among said terminals when the command is a transmission start command, and transferring a reception start signal thereto when the command is a reception request command, means for receiving reception data from said associated data transmission apparatus after transferring said reception start signal, and means for transmitting a transmission end signal to said associated data transmission apparatus when status data received from said associated data transmission apparatus after said reception start signal is transferred is transmission end status data and for transmitting a reception end signal to said associated data transmission apparatus when said status data received therefrom is reception end status data; and each of said plurality of data transmission apparatuses comprising:

means for receiving transmission data from an associated terminal among said terminals and for transmitting said transmission data to a data transmission apparatus associated with a distant terminal through said high-speed transmission line, means for transferring a reception request command to said distant terminal while receiving transmission data for said distant terminal though said high-speed transmission line, means for transferring a send request command to said associated terminal in response to a send request signal from said associated terminal, means for transferring the data received through said high-speed transmission line to said distant terminal in response to a reception start signal from said distant terminal, and means for transferring to said associated terminal a transmission end status signal when the transmission data has been received by said transmission apparatus associated with said distant terminal and transferring a reception end status signal thereto when reception data received through said high-speed transmission line is transferred to said distant terminal.

2. A system according to claim 1, wherein said data transmission apparatus corresponding to said associated terminal transmits reception data from said associated terminal to said data transmission apparatus associated with said distant terminal every time said data transmission apparatus receives the transmission data transmitted from said distant terminal in a predetermined amount, and transmits the reception data from said associated terminal every time said data transmission apparatus receives the data transmitted through said high-speed transmission line in a predetermined amount.

3. A system according to claim 1, wherein said data transmission apparatus having said distant terminal associated therewith sends a reception request command to said distant terminal and detects whether or not the reception start signal is transmitted from said distant terminal within a predetermined period of time.

4. A system according to claim 1, wherein each of said data transmission apparatuses comprises:

first controller means for controlling an interface with said terminal;

second controller means for controlling an interface with said high-speed transmission line;

send buffer means for storing data received from said terminal through said first controller means;

receive buffer means for storing data received from said high-speed transmission line through said second controller means;

first and second counters serving as a write pointer and a read pointer with respect to said send buffer means, respectively;

third and fourth counters serving as a write pointer and a read pointer with respect to said receive buffer means, respectively;

first comparator means for detecting a coincidence between output signals from said first and second counters and for detecting a full state of said send buffer means; and second comparator means for detecting a coincidence between output signals from said third and fourth counters and for detecting a full state of said receive buffer.

* * * * *